(12) United States Patent
Reial et al.

(10) Patent No.: US 8,737,457 B2
(45) Date of Patent: May 27, 2014

(54) ADAPTIVE SMOOTHING OF CHANNEL ESTIMATES

(71) Applicant: Telefonaktiebolaget LM Ericsson (publ), Stockholm (SE)

(72) Inventors: Andres Reial, Malmö (SE); Lennart Morén, Båstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/630,194

(22) Filed: Sep. 28, 2012

(65) Prior Publication Data

US 2014/0092947 A1    Apr. 3, 2014

(51) Int. Cl.
*H04B 3/46* (2006.01)

(52) U.S. Cl.
USPC .......................... 375/224; 375/350

(58) Field of Classification Search
CPC ................. H04L 25/022; H04L 25/0228
USPC .................................. 375/224, 350
See application file for complete search history.

(56) References Cited

U.S. PATENT DOCUMENTS

| | | | |
|---|---|---|---|
| 7,161,896 B1 | 1/2007 | Hart et al. | |
| 7,397,758 B1 | 7/2008 | Hart et al. | |
| 7,821,915 B2 | 10/2010 | Hart et al. | |
| 8,073,393 B2 * | 12/2011 | Yu et al. | 455/67.11 |
| 8,095,076 B2 * | 1/2012 | Aedudodla et al. | 455/67.13 |
| 8,385,478 B1 * | 2/2013 | Liu et al. | 375/340 |
| 2002/0065047 A1 * | 5/2002 | Moose | 455/63 |
| 2004/0240376 A1 * | 12/2004 | Wang et al. | 370/204 |
| 2005/0163258 A1 * | 7/2005 | Gore et al. | 375/340 |
| 2005/0243791 A1 * | 11/2005 | Park et al. | 370/343 |
| 2006/0039459 A1 | 2/2006 | Kolze et al. | |
| 2006/0203932 A1 * | 9/2006 | Palanki et al. | 375/295 |
| 2006/0222094 A1 * | 10/2006 | Makhlouf et al. | 375/260 |
| 2006/0227887 A1 | 10/2006 | Li et al. | |
| 2007/0104253 A1 * | 5/2007 | Luo et al. | 375/148 |
| 2011/0026619 A1 | 2/2011 | Kent et al. | |

FOREIGN PATENT DOCUMENTS

| | | |
|---|---|---|
| CN | 101800617 A | 8/2010 |
| WO | 9715124 A1 | 4/1997 |
| WO | 0011798 A1 | 3/2000 |

* cited by examiner

*Primary Examiner* — Juan A Torres
(74) *Attorney, Agent, or Firm* — Murphy, Bilak & Homiller, PLLC (57) ABSTRACT

Techniques for directly adapting the parameters of a smoothing filter used for channel estimation to the current velocity and signal-to-noise ratio (SNR) situation. An example method begins with a plurality of channel response measurements. For each of a first subset of a set of pre-determined filter responses, the channel measurement samples are filtered to obtain a corresponding set of estimated channel response samples. Next, for each set of estimated channel response samples, a corresponding set of ordered residuals are calculated from the channel measurement samples. Each set of ordered residuals is evaluated to determine a measure of correlation among the ordered residuals, and an updated filter response is selected from a second subset of the set of pre-determined filter responses, based on this evaluation, for use in demodulating a received signal.

27 Claims, 7 Drawing Sheets

ADAPTIVE SMOOTHING OF CHANNEL ESTIMATES

TECHNICAL FIELD

The present application is generally related to communication receivers, and is more particularly related to techniques for obtaining communication channel estimates for use in signal processing.

BACKGROUND

A communications receiver typically needs to know the response of the communications channel, i.e., the response of the link between a remote transmitter and the receiver. This is particularly the case in wireless communications receivers, which generally must cope with interference, multipath scattering, and fading of the transmitted signal, in addition to the reduced signal strength that arises from the distance between the transmitter and receiver. In many systems, the receiver performs frequent estimates of the channel transfer response, as the channel response can change over time.

In the Wideband Code-Division Multiple Access (W-CDMA) systems standardized by members of the $3^{rd}$-Generation Partnership Project (3GPP), for example, estimates of the channel response, hereinafter called "channel estimates," are derived from instantaneous channel measurements, which may in turn be obtained by comparing the received and despread version of the Common Pilot Channel (CPICH) to CPICH symbols that are known to have been transmitted by the remote base station (frequently referred to as a "Node B" in 3GPP documentation). As discussed in further detail below, channel response estimates are often improved by smoothing of these channel measurements, e.g., by filtering several measurements corresponding to multiple symbol times, across one or more slots.

The initial channel measurements used for calculating channel response estimates may be available for different sampling time intervals, such as a symbol or a slot. They may also correspond to specific path delays and/or to specific signal frequencies or frequency bins, e.g., to specific sub-carriers in an Orthogonal Frequency-Division Multiplexing (OFDM) signal. It should be appreciated that the channel transfer response will generally vary with frequency as well as with time, for wideband systems. Accordingly, channel estimation techniques may need to account for time-variation, frequency-variation, or both, in various systems.

The initial channel measurements are typically filtered, i.e., "smoothed," in order to obtain improved channel estimates. This smoothing may be done by averaging the measurements, performing linear regression with the channel measurements, or by using another suitable linear filter. Any of these techniques can be regarded as applying a filter response to the channel measurements, the filter response having a particular time constant and filter bandwidth.

Motion of the receiver or transmitter affects the time-varying nature of the channel response, as changes in the receiver or transmitter positions affect at least the multipath and fading characteristics of the channel. This problem is especially pronounced for high-velocity situations, such as when the receiver is in or attached to a vehicle. A faster rate of change in the channel response means that shorter filter times (i.e., larger filter bandwidths) must be used, to avoid excessive biasing of the resulting channel estimates. Accordingly, in some cases, the filter bandwidth and/or other filter parameters used to obtain channel estimates may depend on the maximum Doppler shift and/or the noise power level. This allows the smoothing filter to be adapted to the velocity of the receiver or transmitter, while also taking account of the noise power level, in some implementations. It is then possible to use more filtering at low velocities and less filtering at high velocities, for example. It is similarly possible to use more filtering when the noise power level is high and less filtering when the noise power level is low.

Generally, the optimal filtering solution is a trade-off between noise suppression and the estimation bias incurred due to errors in channel tracking. Channel estimation techniques need additional improvements to approach the optimal filtering solution over the wide variety of signal conditions and speeds likely to be encountered by a typical receiver.

SUMMARY

Various embodiments of the present invention are based on techniques that directly adapt the parameters of a smoothing filter used for channel estimation to the current velocity and signal-to-noise ratio (SNR) situation. In situations where receiver mobility is a concern, for example, these embodiments can advantageously perform fast filter adaptation without requiring either an estimate of the Doppler spread of the received signal or an estimate of the received noise. As detailed below, these techniques are based on a realization that the residuals, i.e., the differences, between the channel measurements and the channel estimates at the filter output are uncorrelated when the smoothing filter is not introducing estimation bias, but are instead correlated when the smoothing filter bandwidth is biasing the channel estimates. Generally speaking, the most accurate channel response estimates can be obtained by applying as much filtering as possible in each situation, while still producing uncorrelated residuals or residuals with sufficiently low correlations.

According to one aspect, several methods for obtaining smoothed channel response estimates in a communications receiver are disclosed. An example method begins with performing a plurality of channel response measurements corresponding to a path delay or to a signal frequency/frequency bin, or both, to obtain ordered channel measurement samples for a current estimation interval. For each of a first subset of a set of pre-determined filter responses, the ordered channel measurement samples are filtered to obtain a corresponding set of estimated channel response samples. Next, for each set of estimated channel response samples, a corresponding set of ordered residuals are calculated from the channel measurement samples. Each set of ordered residuals is evaluated to determine a measure of correlation among the ordered residuals, and an updated filter response is selected from a second subset of the set of pre-determined filter responses, based on this evaluation, for use in demodulating a received signal.

In some embodiments, the first subset of pre-determined filter responses contains two or more predetermined filter responses, each having a filter bandwidth, and the second subset is equal to the first subset. In these embodiments, the method further includes using the set of estimated channel response samples corresponding to the selected one of the predetermined filters for demodulating the received signal in the current estimation interval. In some of these embodiments, this selection is performed by selecting the set of estimated channel response samples corresponding to the lowest filter bandwidth among those of the two or more predetermined filter responses that produce a corresponding measure of correlation less than a predetermined threshold value.

In other embodiments, the first subset of pre-determined filter responses contains a single predetermined filter response. The second subset includes the first subset and one or more additional pre-determined filter responses. In these embodiments, the method further includes using the updated filter response to demodulate the received signal in the current estimation interval or in an estimation interval immediately following the current estimation interval. In some of these embodiments and in some situations, the evaluating involves determining that the measure of correlation for the single predetermined filter response is less than a first threshold, and the selecting of the updated filter response is performed by selecting a channel filter response that has a lower bandwidth than the first channel filter response. In other cases, the receiver determines that the measure of correlation for the single predetermined filter response is greater than a second threshold and selects a channel filter response that has a higher bandwidth than the first channel filter response. In other embodiments and/or in other situations, the receiver determines that the measure of correlation the single predetermined filter response is between a first threshold and a second threshold, and selects the same channel filter response used in a current estimation interval for use in an estimation interval immediately following the current estimation interval.

In some embodiments, evaluating each set of ordered residuals comprises calculating a correlation function of the ordered residuals, wherein the measure of correlation is equal to a ratio of the correlation value at a lag of zero to the total correlation weight, i.e., the sum of all correlation values over the entire correlation response. In others, evaluating each set of ordered residuals comprises counting a number of zero crossings between consecutive ones of the ordered residuals, wherein the measure of correlation is inversely related to the number of zero crossings. In some of these embodiments, the evaluation includes determining a probability that sufficiently uncorrelated residuals would give rise to the counted number of zero crossings, wherein the measure of correlation is the determined probability.

In several embodiments, the ordered channel measurement samples are time-ordered channel measurement samples taken over an interval of time. In others, the ordered channel measurement samples are frequency-ordered channel measurement samples taken across a set of sub-carrier frequencies.

Any of the methods summarized may be repeated several times, in some embodiments of the present invention, such that each of the performing, filtering, calculating, evaluating, and selecting operations described above are repeated for each of a series of channel estimation intervals.

According to another aspect, communications receiver circuits configured to carry out one or more of the methods described above are disclosed. An example communications receiver circuit includes a channel response measurement circuit, which is configured to perform a plurality of channel response measurements corresponding to a path delay or to a signal frequency, or both, to obtain ordered channel measurement samples for a current estimation interval, and further includes a processing circuit, which is configured to receive the channel measurements from measurement circuit and to evaluate them according to one or more of the techniques described above to select a smoothing filter response for generating smoothed channel response estimates. Accordingly, the processing circuit in some embodiments is configured to: filter the ordered channel measurement samples to obtain a corresponding set of estimated channel response samples, for each of a first subset of a set of pre-determined filter responses; calculate a corresponding set of ordered residuals from the channel measurement samples, for each set of estimated channel response samples; evaluate each set of ordered residuals to determine a measure of correlation among the ordered residuals; and select an updated filter response from a second subset of the set of predetermined filter responses for use in demodulating a received signal, based on said evaluating. Wireless devices that include such a receiver circuit are also disclosed.

The methods, circuits and devices summarized above provide improved channel response smoothing and enhanced receiver performance. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention is described more fully hereinafter with reference to the accompanying drawings, in which examples of embodiments of the invention are shown. The methods, circuits and devices of this disclosure may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments are described herein in the context of operating in a radio access network (RAN) that communicates over radio communication channels with wireless terminals (also referred to as user equipment, or "UEs"). The embodiments are applicable to communications systems based on any of TDMA, CDMA, FDMA, or OFDM radio access technologies in general. More particularly, specific embodiments are described in the context of systems using W-CDMA and/or High-Speed Packet Access (HSPA) technologies, as standardized by the membership of the 3rd Generation Partnership Project (3GPP). It will be understood, however, that the present disclosure is not limited to such embodiments and may be embodied generally in various types of communication networks, including, for example, the so-called Long-Term Evolution (LTE) networks also standardized by 3GPP.

As used herein, the terms mobile terminal, wireless terminal, wireless device or UE can refer to any device that receives data from a communication network, and may include, but are not limited to, a mobile telephone ("cellular" telephone), laptop/portable computer, pocket computer, hand-held computer, modem and/or desktop computer. These terms could also refer to machine-to-machine type communication devices, used without direct human interaction. One example of such device would be a sensor.

Also note that the use of terminology such as "base station" (which may be referred to in various contexts as a NodeB, for example) and "wireless terminal," "mobile terminal," or "wireless device" (often referred to as a "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel.

Likewise, the terms "transmitting node" and "receiving node" may be used herein to distinguish one device from another, with the "transmitting" and "receiving" designations used only to indicate which device is at which end of a particular transmission or transmissions of interest. Again, the use of these terms does not necessarily imply a certain hierarchical relation between two particular nodes of a communication link. It should be appreciated, of course, that a "transmitting node" may often (and may generally) include receiving hardware, just as a "receiving node" may be adapted to transmit signals as well. While embodiments discussed herein may focus on wireless transmissions in a downlink from a base station (a Node B, in 3GPP specifications for W-CDMA, for example) to a UE, the inventive techniques may also be applied, for example, to uplink transmissions in some contexts. As a result, several embodiments of the invention described in detail below may be suitable for use in various wireless terminals, base stations, or both.

It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

For simplicity, the discussion that follows generally focused on the estimation of a single channel coefficient, to represent the channel estimate for a given time interval. It will be appreciated that this can be easily extended to channel response estimates represented by several coefficients, e.g., for each of several path delays, or for each of several frequencies, or both. For instance, the techniques described below can simply be performed separately for each coefficient, using channel measurements corresponding to the delay and/or frequency for the coefficient. Upon reading the detailed description below, those skilled in the art will appreciate that other approaches may also be used.

Also of note is that the terms "filter length," "filter time," and "filter bandwidth" are used frequently in the following discussion to refer to the transfer response of the filter applied to channel measurements. Those skilled in the art will appreciate that these terms are closely related, and in some cases may be used interchangeably. More precisely, the term "filter time" refers to a time constant for the filter. While any of several particular definitions of a filter time constant are possible, the "filter time" refers to an interval of time, e.g., a time "window," over which channel response measurements (inputs to the filter) have an effect on a channel response estimate for a particular time or interval. It is well known that the filter time is inversely proportional to the "filter bandwidth."

Again, any of several particular definitions for filter bandwidth are possible, but all generally refer to the possible time-variability in the filter output, i.e., in the channel estimate. A given filter bandwidth means that significant variations in the channel estimates at frequencies outside the filter bandwidth will not be seen. Finally, the term "filter length" may sometimes refer to the number of channel response measurements that fall within the filter time, or may refer to the filter time itself. It should be further appreciated that the use of a filter is not limited to filtering time series; thus, the filter length may refer to the number of input samples that affect a particular filter output coefficient. Because of the close relationship between these terms, statements regarding any one of these terms in the following discussion should be understood to apply in a corresponding sense to the others, unless the context clearly indicates otherwise. Thus, for example, a statement regarding the effects of a relatively short filter time should also be understood to apply to a relatively wide filter bandwidth, and vice versa.

Several previously known techniques for channel estimation involve the adaptation of the filter response used to smooth channel measurements. Some of these known techniques require knowledge of the maximum Doppler shift and the noise power level of the channel measurements, e.g., as characterized by a signal-to-noise ratio (SNR) or signal-to-interference-plus-noise ratio (SINR). An example of such a solution is discussed in published patent application US 2006/0227887. The SNR is relatively fast and easy to estimate. However, the maximum Doppler shift, on the other hand is more difficult to estimate, since doing so requires long estimation times. For instance, assume that the needed estimation time is ten periods of the maximum Doppler shift. In this case, the estimation time becomes almost two seconds at three kilometers/hour in the 2.1 GHz frequency band.

Another fundamental problem is the need to identify measurement variations that are caused by the channel, in contrast to the measurement variations that are caused by noise. This requires some prior knowledge of or assumptions regarding the signal-to-noise ratio and the maximum Doppler shift to be estimated. Other difficulties include frequency offsets between the transmitter and receiver that arise for reasons other than relative motion between the devices. These difficulties implicate the Automatic Frequency Control (AFC) and Automatic Gain Control (AGC) functions of the receiver.

One possible approach is to use each of several different smoothing filters, each having its own filter length/bandwidth, to produce several different channel response estimates for each observation interval. These distinct channel response estimates can then be used separately to demodulate the received signal and to obtain demodulated data symbols from the received signal. The SINR for each of the data symbols output in this manner can then be computed, and the output/smoothing filter corresponding to the best SINR selected. Such a solution is described in issued U.S. Pat. No. 7,821,915 B1. However, this approach requires the implementation of full demodulation chains for each of several smoothing filter responses, which can result in a significant increase in receiver complexity.

A better approach, according to embodiments detailed below, is to adapt the smoothing filter by choosing from among several possible smoothing filter transfer responses based observing the residuals resulting from the application of one or more filter responses to channel response measurements. The term "residuals" is used here to refer to a calculated difference between the unfiltered channel measurements and the estimated channel response, after application of a given smoothing filter response.

As can be seen from the detailed description of this approach that follows, this technique does not require an explicit Doppler estimate or an estimate of the received noise to select the time constant for smoothing/filtering. Advantageously, a system implemented according to these techniques filters as heavily as it can (i.e., using the largest possible bandwidth) without introducing an unacceptable degree of bias, the occurrence of which is noted when correlated residuals are detected.

Another advantage with various embodiments of the present disclosure described below is that they directly adapt the parameters of a smoothing filter used for channel estimation to the current velocity and signal-to-noise ratio (SNR) situation. As detailed below, these techniques are based on a realization that the residuals, i.e., the differences, between the channel measurements and the channel estimates at the filter output are uncorrelated when the smoothing filter is not introducing estimation bias, but are instead correlated when the smoothing filter bandwidth is biasing the channel estimates. Thus, the most accurate channel response estimates can be obtained by applying as much filtering as possible in any given situation, while still producing uncorrelated residuals or residuals with very low correlations.

Figure 1:
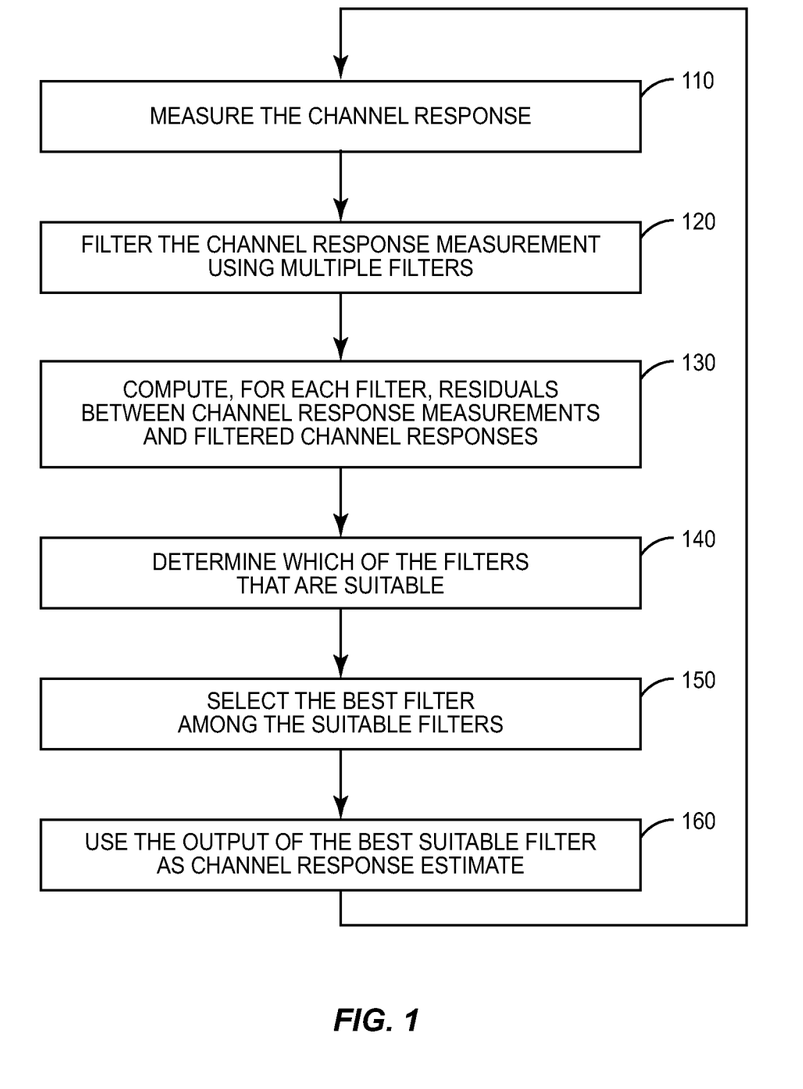
FIG. 1 is a process flow diagram illustrating an example method according to some embodiments of the invention.
Figure 2:
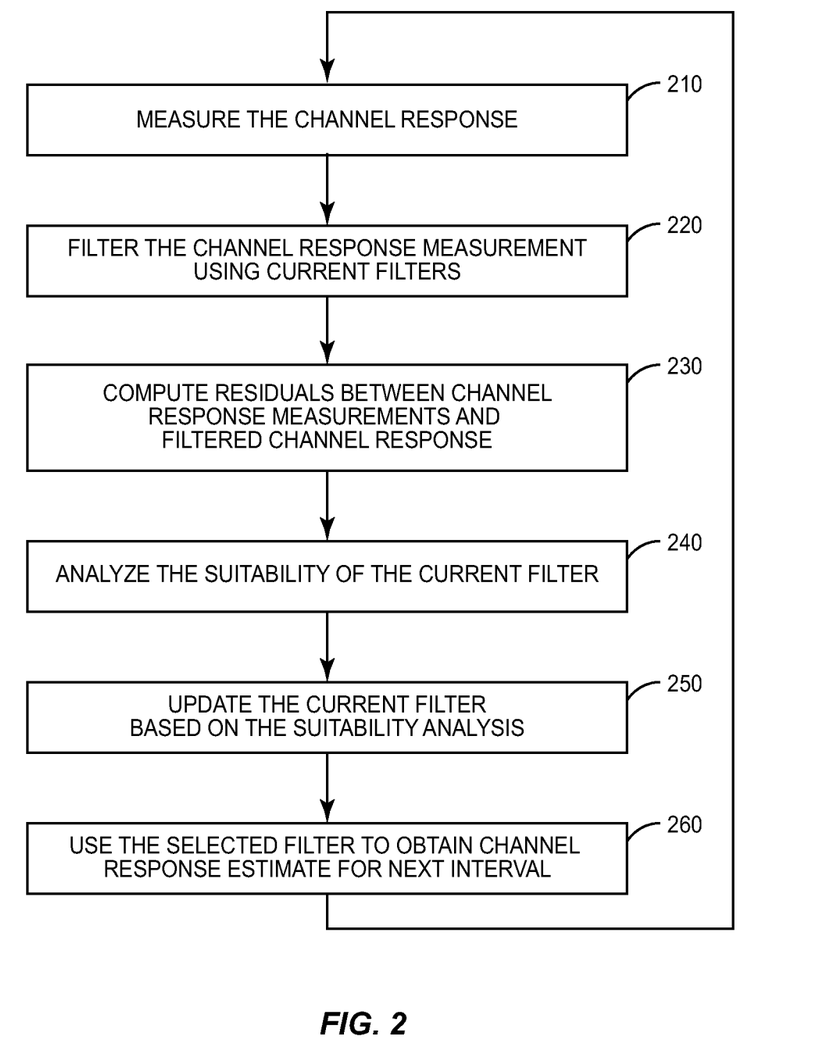
FIG. 2 is a process flow diagram illustrating another example method according to some embodiments of the invention.

The process flow diagram of FIG. 1 illustrates one example method for obtaining smoothed channel response estimates having reduced tracking bias, i.e., the estimation bias incurred due to errors in the channel tracking, as implemented in a communications receiver. This process flow diagram illustrates one variant of the residuals-based approach in which the residuals corresponding to multiple filters are evaluated for each time interval of interest, to determine the best filter to use for that time interval. Another variant is illustrated in FIG. 2, in which only one filter response is evaluated per time interval of interest.

Referring again to FIG. 1, the illustrated process begins, as shown at block 110, with a measurement of the channel response for a measurement interval of interest, to obtain a plurality of channel measurements. These channel measurements are samples of the underlying temporal channel response, and are typically noisy. The measured channel response typically corresponds to a particular path delay and/or a particular signal frequency or frequency bin or frequency range. While the channel measurements are often time samples, i.e., a series of measurements taken at different times, such as for each of several consecutive symbols in a transmission-time interval, the technique illustrated in FIG. 1 and the other techniques described herein can be applied to any ordered set of channel measurements for which filtering is appropriate, such as frequency-ordered samples taken across multiple subcarriers of an Orthogonal Frequency-Division Multiplexing (OFDM) signal. Accordingly, just as no initial Doppler estimate is required to perform an appropriate smoothing of time-ordered channel measurements, no initial channel dispersion estimate is required to smooth frequency-ordered channel measurements. Indeed, it will be appreciated that the applications of these techniques in the time and frequency domains are simply duals of one another.

A wide variety of techniques for performing channel response measurements are known, including techniques based on measuring known pilot symbols, such as the CPICH in 3GPP W-CDMA systems. Techniques that rely on measurements of pseudo-pilot symbols or data symbols are also well known. For the purposes of the present discussion, however, the exact technique used to obtain the channel measurements is not important.

As shown at block 120, the channel measurement samples are filtered, using multiple smoothing filters. Accordingly, multiple filtered channel response estimates are obtained, each corresponding to one of the smoothing filters in a predetermined set of available filters. These filters typically have different bandwidths and/or other filter characteristics, to provide different amounts of smoothing. For example, the set of filter responses may include a set of averaging filters, each having a different length N, where N is the number of consecutive channel measurements that are averaged to obtain a filter output. As another example, the set of filter responses may include several recursive filters, having different time constants. However, it is important to note that the choices of filter types to which the inventive techniques described herein may be applied are not limited to these cases. It should also be appreciated that the available filter responses may include responses for filters of two or more different types, in some cases.

As shown at block 130, residuals, i.e., the differences between the filter outputs and the initial channel measurements, are computed for each of the filter responses. Multiple residuals for each filter response are needed to evaluate whether or not each filter response is unduly biasing the channel response estimate. Thus, for example, a set of M residuals might be computed for each filter response. These M residuals might simply be the differences between M filter output samples and corresponding channel measurement inputs, for example, in filters having the same input and output rates, or may involve the calculation of differences between a filter output sample and several input samples, in other cases. In still other cases, residuals may be calculated by subtracting input samples from values interpolated from output samples. This latter approach may be preferred when the output rate of the filter is lower than the input rate. In any case, because the residuals will next be subjected to correlation analysis, the ordering of the residuals is important, whether the residuals are time-ordered or frequency-ordered.

An important concept underlying the techniques described here is that residuals corresponding to a given filter response will be substantially uncorrelated when a suitable filter is used, i.e., one that does not introduce a significant channel tracking bias. If a filter with too narrow a bandwidth is used, on the other hand, an estimation bias will be introduced. This estimation bias will manifest itself in a correlation among the residuals.

Accordingly, as shown at block 140, the residuals corresponding to each of the filter responses are evaluated to determine which of the filter responses are suitable, i.e., which of the filter responses do not introduce an excessive channel tracking bias. This can be done by determining the extent of the residuals' correlation. This correlation analysis of the residuals may be performed in several different ways. For example, in one approach, a correlation function is computed from the residuals for a given filter response, and the filter response is determined to be suitable if at least a predetermined fraction of the total correlation weight is located at lag zero. In another approach, the number of sign changes between each pair of the ordered residuals is counted, and the filter is determined to be suitable if the number of sign changes over a given observation time equals or exceeds a threshold value that indicates a substantial lack of correlation.

An example method would be to make a hypothesis test, in which it is assumed that the probability for a sign change between two samples is p. For example, p=0.5 for fully uncorrelated samples. We could then say that a filter is suitable unless the number of sign changes, n, is unexpectedly small:

$$\sum_{k=0}^{n} \frac{(M-1)!}{k!(M-1-k)!} p^{M-1} < p_{reject},$$

where the left hand side equals the probability that there are up to n sign changes during M observations, for a process governed by the given probability p. Each term in the summation expresses the probability that there are k sign changes under the hypothesis that a sign change occurs with probability p. The sum thus expresses the probability that there are at most n sign changes under the hypothesis. If this probability, for the observed number of sign changes n, is small (less than $p_{reject}$) then it is unlikely that the original hypothesis is correct. We then assume that the used filter is unsuitable, and should be rejected from selection. The value of the rejection level is chosen in the interval 0-1, with 0.3 as an example value. In some implementations the rejection level $p_{reject}$ and the hypothesized sign change probability p may be statically defined. In others, however, these parameters may be dynamically selected, i.e., varying from one evaluation to another, based on other variables such as the SNR of the initial channel estimates. In general, lower p and/or higher $p_{reject}$ may be chosen for lower initial channel estimation quality. Alternatively, other related metric constructions, based on the observed sign change pattern and the binomial coefficient, can be envisioned.

As shown at block 150, the "best" filter among the suitable filters is then selected. The best filter would typically be the suitable filter that provides the most smoothing. Assuming that the filters are averaging filters with different filtering times, this would mean that the suitable filter (i.e., a filter from among those producing substantially uncorrelated residuals) with the longest filtering time (i.e., the smallest bandwidth) is selected. Assuming that the set of available filters are designed for different maximum Doppler shifts (e.g. optimal linear time-invariant filters), the suitable filter designed for the smallest maximum Doppler shift will be selected. Generally, a suitable filter with lower bandwidth is preferred over a filter with higher bandwidth.

Finally, the output of the filter deemed the best among the suitable filters, is used as the channel estimate, as shown at block 160. The channel estimate corresponding to this best filter may be used for any of several purposes, such as for demodulating unknown symbols from the received signal for a current time interval.

The operations illustrated at blocks 110 to 160 are repeated, every one or several time instants. In some embodiments, the set of multiple smoothing filters to be used in block 120, the first subset, in the next time interval may be updated based on the latest "best" filter result from block 150 in the current time interval. For example, the set of multiple smoothing filters may contain the current best filter and one or more filters with lower and higher bandwidths in the neighborhood of the bandwidth of the current best filter. Each time, the same or a different filter may be chosen, depending on the channel measurements. Thus, the illustrated process proves adaptive smoothing of the channel estimates.

In the process flow illustrated in FIG. 1, multiple filters are evaluated for each time interval of interest, to determine the best filter to use for that time interval. FIG. 2 illustrates a slightly different approach, in which only one filter response is evaluated per time interval of interest. With this approach, parallel filtering of the same channel measurements is avoided, thus reducing receiver complexity. Instead, only a single filter is used at each estimation update. The tradeoff, however, is that adaptation rate may be lower with this approach.

Referring to FIG. 2, the illustrated process begins, as shown at block 210, with a measurement of the channel response for a measurement interval of interest, to obtain a plurality of channel measurements. This operation corresponds directly to that pictured in block 110 of FIG. 1. Once again, the channel measurements are samples of the underlying temporal channel response, and are typically noisy. Once again, the measured channel response typically corresponds to a particular path delay and/or a particular signal frequency or frequency range. As was the case with the process illustrated in FIG. 1, a variety of techniques to obtain the channel measurements are possible; the specifics are not important for understanding the present invention.

As shown at block 220, the channel measurement samples are filtered. This time, however, only a single smoothing filter is used. This filter is referred to as the "current filter" in FIG. 2, indicating that this filter is the smoothing filter applied to channel response measurements in a current time interval. As will be seen, in an iterative process as illustrated in FIG. 2, the current filter is generally the filter selected in a previous iteration of the process. On start-up, however, the current filter may be a default filter selected from a set of available filter responses. Note that the set of filters from which the current filter is taken can include any of the filter response types and characteristics discussed above in connection with FIG. 1.

Referring again to FIG. 2, the illustrated process continues, as shown at block 230, with the calculation of residuals corresponding to outputs from the current filter. In the process illustrated in FIG. 1, multiple sets of residuals are computed. In the process shown in FIG. 2, however, residuals are computed only for the current filter response. The range of possible techniques for computing the residuals are the same, however.

Again, residuals corresponding to a given filter response will be substantially uncorrelated when a suitable filter is used, i.e., one that does not introduce a significant channel tracking bias. If a filter with too narrow a bandwidth is used, on the other hand, an estimation bias will be introduced. This estimation bias will manifest itself in a correlation among the residuals. In the process illustrated at FIG. 2, the question is not which filter responses among a set of available responses are suitable, but whether or not the current filter response is introducing an undue amount of estimation bias.

Accordingly, as shown at block 240, the residuals corresponding to the filter response is evaluated to determine whether the current filter is suitable, i.e., whether or not the current filter is introducing an excessive bias. As was the case with the process illustrated in FIG. 1, this can be done by determining the extent of the residuals' correlation. However, in the process shown in FIG. 2, this is performed for only a single filter. The range of possible techniques for performing the correlation analysis is the same, however. Thus, for example, a correlation function may be computed from the residuals for a given filter response, and the filter response determined to be suitable if at least a predetermined fraction of the total correlation weight is located at lag zero. Alternatively, for example, the number of sign changes between each pair of the ordered residuals is counted, and the filter is determined to be suitable if the number of sign changes over a given observation time equals or exceeds a threshold value that indicates a substantial lack of correlation.

As shown at block 250, the filter is updated, based on the suitability analysis for the current filter. This updating, which amounts to selecting the new or next "current" filter for a subsequent iteration of the process, may be done in several different ways. In one approach, if the current filter is highly suitable, i.e., producing very clearly uncorrelated residuals, then it is assumed that the filter response is relatively far from causing a tracking bias, and that heavier filtering can thus be applied, for the current estimation interval or a subsequent interval. Consequently, we can select a filter having a lower bandwidth for the next iteration, such as a filter having the next lower bandwidth compared to the current filter response. In contrast, if the suitability is low, i.e., the residuals appear unacceptably correlated, then it is assumed that less filtering should be applied, in which case a filter with a higher bandwidth is selected for the next update. In some embodiments, it is possible to determine that the current filter is neither clearly suitable nor clearly unsuitable, i.e., on the borderline of introducing tracking bias. In these embodiments, the current filter selection may be maintained.

The determinations discussed above may be made using suitable thresholds. In some embodiments, a single threshold is used, with suitability results falling on one side triggering a selection of a higher bandwidth filter and suitability results falling on the other side triggering a selection of a lower bandwidth filter. The difference of the suitability metric from the threshold value can be used to determine the extent of the selected bandwidth change. In other embodiments, two thresholds are used, with suitability results falling between the two thresholds indicating that no filter change is needed for the current iteration. Note that the threshold or thresholds for "suitability", such as the value of $p_{reject}$ may be fixed, in some embodiments, or may be scenario-specific, e.g., chosen based on an initial channel estimate quality. In a somewhat different approach, a hysteresis approach may be used if it is desirable to reduce the number of filter changes, which may be the case if substantial additional computational effort is needed to effect a change in filter response. Still further, in some cases, a "bumpless transfer" approach may be used, to avoid filter transients after a filter change; thus additional constraints on when the selected filter is applied or on which filter is selected may apply.

Referring once again to FIG. 2, block 260 indicates that the selected filter is used to obtain the channel response estimate for the next estimated interval. Thus, the process loops back to the beginning again, where channel response measurements are taken for the next interval and filtered, using the new "current" filter response. It should be appreciated that with this approach only one filter is applied to channel response measurements for any given estimation interval, even if the suitability testing for that filter indicate that some estimation bias is being introduced. Accordingly, the threshold or thresholds for evaluating suitability should be selected to account for this. Note that an alternate approach is to test a single new "current" filter in each estimation interval, as illustrated at blocks 210 to 240, but then, if a change in filter occurs, use the updated filter to obtain a final channel response for the current estimation interval. With this approach, two filters are applied to the current channel measurements in each estimation interval where a change in filter takes place.

In another variant of the approach illustrated in FIG. 2, the principle of the "jump algorithm," as sometimes applied in power control loops, is applied to determine whether more or less smoothing should be applied. At update instants when the current filter is found to be unsuitable (e.g., uncorrelated residuals are detected), the extent of smoothing is rapidly reduced to avoid any continuation of the damaging bias. On the other hand, when the current filter is found to suitable, the extent of smoothing is increased, but at a slower rate. For example, a reduction in smoothing triggered by a finding of excessive residual correlation may be performed by selecting a filter that has a window length that is smaller than that of the current filter by a factor of $f_1$. An increase in smoothing, on the other hand, is performed by increasing the window length by a factor of $f_2$, where $f_2$ is smaller than $f_1$. The slow increase continues until an onset of bias is again detected, at which point the filter length is rapidly reduced again.

Figure 3:
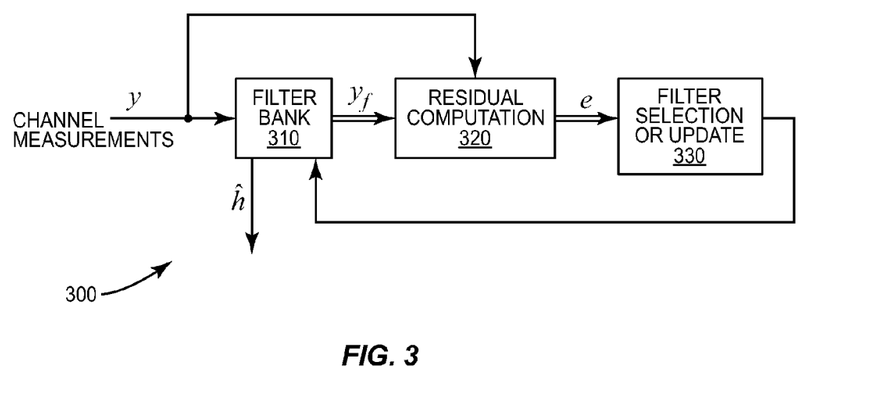
FIG. 3 illustrates functional components of a receiver circuit according to some embodiments of the invention.

FIG. 3 is a block diagram illustrating functional components of a communications receiver 300 configured to carry out one or more of the techniques described herein. The initial channel measurements y are filtered by one or multiple filters in the filter bank in block 310, providing smoothed channel estimates $y_f$. These one or more filtered channel measurements $y_f$ are compared to the channel measurements y to generate residuals in block 320. The residuals are the basis for the filter selection or filter update in block 330. The output of the selected filter is used as a channel estimate in block 310. Note that when the receiver is configured to carry out a method like that illustrated in FIG. 2, the filter bank 310 implements only a single filter per estimation interval (or at most two), and smoothed channel estimates $y_f$ corresponding to only a single filter are propagated from block 310 to 320 for evaluation.

Figure 4:
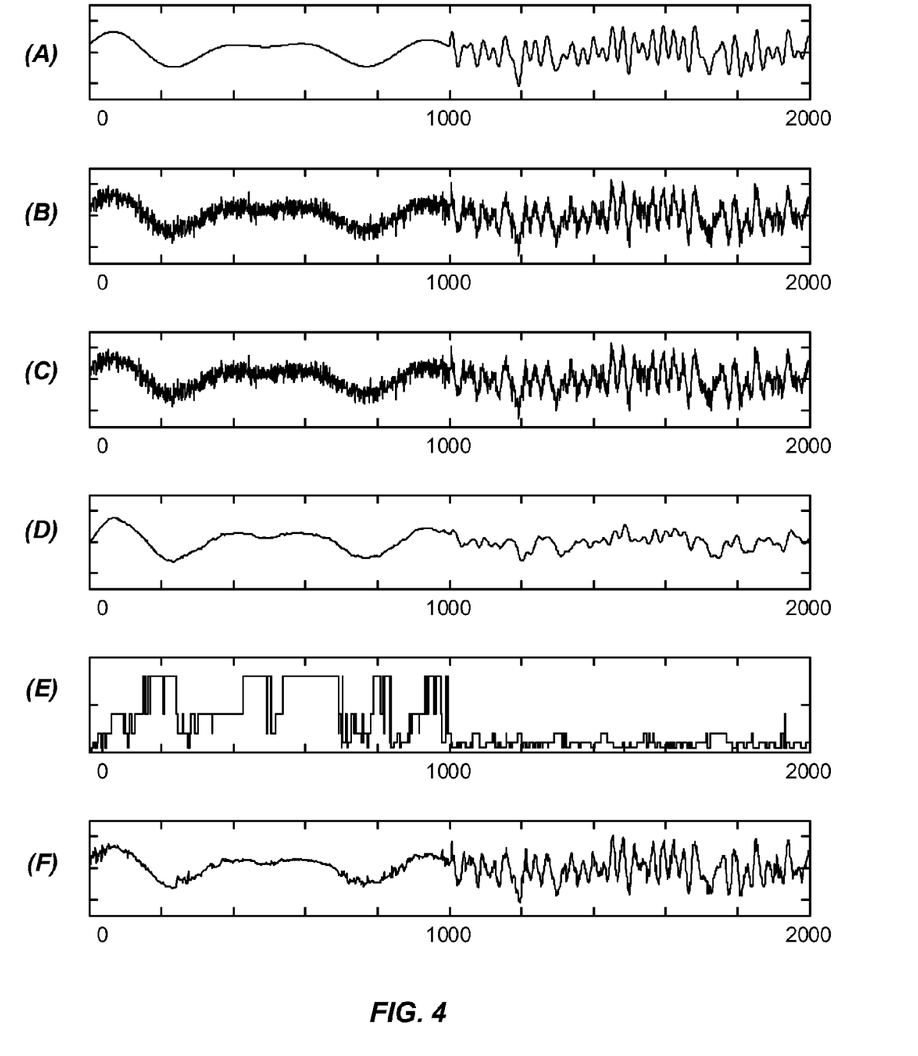
FIG. 4 illustrates simulation results demonstrating an example embodiment.

FIG. 4 illustrates simulation results that demonstrate the operation of an example implementation of the methods in a laboratory setting. We consider a channel response, h, corresponding to the real part of a Rayleigh fading tap in a WCDMA system. A "true" simulated channel response curve is shown in part (a) of FIG. 4, which shows the amplitude of the real part of the tap versus time, indicated by sample numbers. It can be seen that approximately half-way through the simulation (at about sample 1000), the channel changes begin to occur more rapidly. This represents a change in receiver velocity from 3 km/h to 30 km/h after 1000 samples. The sampling rate is one slot.

Of course, a real receiver cannot measure the "true" channel response, since the receiver is subject to interference and noise. Accordingly, simulated channel measurements are illustrated in part (b) of FIG. 4. These consist of the channel response with added white noise. The SNR of the initial channel measurements is 0 dB.

For the purposes of the simulation illustrated in FIG. 4, it is assumed that the available filters comprise a filter bank with six different averaging filters, with lengths 2, 5, 10, 20, 40 and 80. Part (c) of FIG. 4 illustrates the result of filtering the channel measurements with only the shortest (highest bandwidth) filter—the results are virtually indistinguishable from the channel measurements, and the noise obscures the true channel response across the entire simulation time. Part (d), on the other hand, shows the result of applying only the longest (lowest bandwidth) filter to the channel measurements. In this case, the results track the slow changes of the "true" channel response very well, but fail to keep up with the more rapid changes later in the simulation run. Accordingly, the heaviest filtering is introducing estimation bias in the later parts of the simulation, while the lightest filtering does not suppress the noise to any significant degree.

Parts (e) and (f) of FIG. 4 illustrate the results of implementing one embodiment of the present invention. For the purposes of the simulation, the number of considered residuals is chosen to be equal to the filter length, M=N, and the rejection level is chosen to be $p_{reject}$=0.3. At each simulation time, residuals corresponding to all of the filters are evaluated, and the lowest bandwidth filter among those that are suitable for a given simulation instant is chosen. Part (e) of FIG. 4 shows the filter selection as a function of simulation time, where the vertical access represents the length of the selected filter. It can be clearly seen that as a general rule, longer filter lengths are usually applied during the first half of the simulation, while much shorter filter lengths are applied during the second half.

The filtered channel measurements resulting from the adaptive selection of the filter lengths is shown in part (f). It can be seen that the adaptive filtering method is able to provide good estimates at both low and high velocities. This can be compared with the short filter that is noisy at 3 km/h and the long filter that is unable to track changes at 30 km/h.

While the simulation in FIG. 4 demonstrates an example of the disclosed methods as applied to smooth a time-ordered series of channel measurements, it should be appreciated that the same techniques can be applied to channel measurements taken across frequency, rather than across time, such as frequency-ordered samples taken across multiple subcarriers of an Orthogonal Frequency-Division Multiplexing (OFDM) signal.

Figure 5:
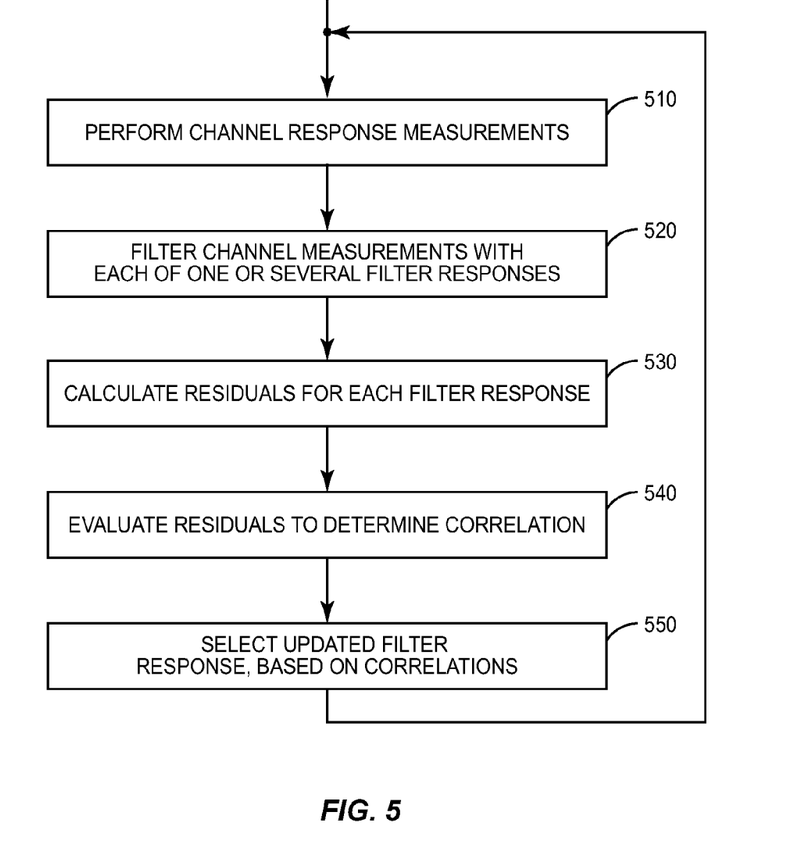
FIG. 5 is a process flow diagram illustrating a generalized method according to several embodiments of the invention.

FIG. 5 is a process flow diagram illustrating a generalized method for obtaining smoothed channel response estimates in a communications receiver. It should be appreciated that the processes illustrated in FIGS. 1 and 2 represent two possible implementations of the method illustrated in FIG. 5; as discussed below, other variations are also possible. It should also be appreciated that the illustrated method can be applied to frequency-ordered channel measurements as well as time-ordered channel response measurements.

The illustrated method begins, as shown at block 510, with performing a plurality of channel response measurements corresponding to a path delay or to a signal frequency, or both, to obtain ordered channel measurement samples for a current estimation interval.

Next, as shown at block 520, the ordered channel measurement samples are filtered, to obtain a corresponding set of estimated channel response samples. This is done for only a single filter, i.e., a "current" filter, in some cases, as discussed in connection with FIG. 2. In other cases, this is done for each of several available filters, as was shown in FIG. 1. Accordingly, the operation shown at block 520 of FIG. 5 can be understood to be applied to a first subset of a set of pre-determined filter responses available to the receiver, where the first subset includes only a single filter in some cases.

As shown at block 530, the illustrated method continues with the calculation of a corresponding set of ordered residuals from the channel measurement samples, for each set of estimated channel response samples obtained above. Thus, in cases where only a single filter is applied in the operation shown at block 520, only a single set of residuals is computed in the operation depicted at block 530. In other cases, multiple sets of residuals are calculated.

As shown at block 540, each set of ordered residuals is then evaluated, to determine a measure of correlation among the ordered residuals. As shown at block 550, the resulting measure or measures of correlation are used to select a filter response from a second subset of the set of pre-determined filter responses, for use in demodulating a received signal. In implementations that follow the general approach illustrated in FIG. 1, the selected filter may be chosen from among all or part of the filters that were earlier evaluated for their suitabilities, in which case this second subset of pre-determined filter responses may include all of the available filters. In implementations where only a single filter is evaluated at each instance, the selected filter may be selected from fewer than all of the available filters, e.g., from the next longer and next shorter filter.

As noted above, in some cases the first subset of pre-determined filter responses contains two or more predetermined filter responses (each having a filter bandwidth) each of which is evaluated for its suitability using residuals computed with a current set of channel measurements. In some of these embodiments, the second subset of filters, i.e., the set of filters from which the filter to be used is selected, is equal to the first subset. In these embodiments, the estimated channel response samples corresponding to the selected one of the predetermined filters have already been calculated when the filter is selected, and thus can be used to demodulate the received signal in the current estimation interval. As noted earlier, more smoothing is generally preferred, if it can be performed without introducing undue tracking bias. Accordingly, in some of these embodiments, the selected filter is the one having the lowest filter bandwidth among those of two or more pre-determined filter responses that produce a corresponding measure of correlation less than a predetermined threshold value. This threshold value can be understood as representing the upper limit of the estimation bias that is allowable.

Also as noted above, in some cases the first subset of pre-determined filter responses contains a single predetermined filter response. In other words, only a single, "current" filter response is evaluated for suitability at each estimation interval. In some of these embodiments, the candidate filters from which the next filter is chosen include this current filter response and one or more additional pre-determined filter responses, e.g., the filter response having the next shorter length and the filter response having the next longer length. In these embodiments, the selected filter response is used to provide channel response estimates for demodulating the received signal in the current estimation interval, in some cases, or in a next estimation interval, i.e., an estimation interval immediately following the current estimation interval.

Figure 6:
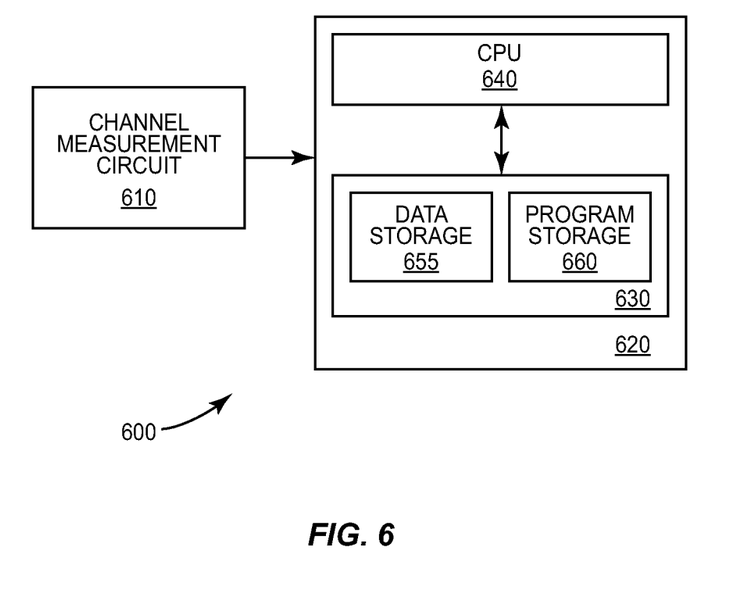
FIG. 6 is a block diagram illustrating components of an example receiver circuit.

The techniques illustrated in FIGS. 1, 2, and 5, and all of the variants discussed above, can be implemented in a communications receiver having the functional components illustrated in FIG. 3. FIG. 6 is a block diagram of one example implementation of a receiver circuit 600 configured according to the present invention. It will be appreciated that receiver circuit 600 can likewise be adapted to carry out any of the techniques illustrated in FIGS. 1, 2, and 5, and variants of those techniques.

Receiver circuit 600 includes a channel response measurement circuit 610, which is configured to perform a plurality of channel response measurements corresponding to a path delay or to a signal frequency, or both, to obtain ordered channel measurement samples for a current estimation interval. In general terms, measurement circuit 610 is configured to compare samples derived from the received signal to the known transmitted signal to obtain these channel measurement samples. In some embodiments, measurement circuit 610 comprises one or more receiver "taps," or correlators, which are arranged to despread a received CDMA signal using a known channelization code and/or scrambling code, to obtain despread samples of a pilot signal having known symbol values. The ratio of each despread sample to the corresponding known symbol values represents a channel response measurement.

Receiver circuit 600 further includes a processing circuit 620, which is configured to receive the channel measurements from measurement circuit 610 and to evaluate them according to one or more of the techniques described above to select a smoothing filter response for generating smoothed channel response estimates. Accordingly, processing circuit 620 in some embodiments is configured to: filter the ordered channel measurement samples to obtain a corresponding set of estimated channel response samples, for each of a first subset of a set of pre-determined filter responses; calculate a corresponding set of ordered residuals from the channel measurement samples, for each set of estimated channel response samples; evaluate each set of ordered residuals to determine a measure of correlation among the ordered residuals; and select an updated filter response from a second subset of the set of predetermined filter responses for use in demodulating a received signal, based on said evaluating.

Processing circuit 620 includes a central-processing unit (CPU) 640, which may comprise one or more microprocessors, microcontrollers, and/or the like, coupled to memory unit 630. Memory unit 630, which may comprise one or several types of memory such as RAM, ROM, Flash, optical storage devices, magnetic storage devices, and the like, stores computer program instructions 660 for execution by CPU 640, and stores program data 655. Program instructions 660 include instructions for carrying out one or more of the techniques described above.

It will be appreciated by those familiar with receiver circuit design that the partitioning of functionality between the measurement circuit 610 and processing circuit 620 is but one example. For instance, in this example, the filtering functionality is carried out by processing circuit 620, using an appropriately programmed microprocessor or microcontroller 640. In other embodiments, all or part of the filtering functionality might be carried out in a separate processing circuit, with or without a programmed controller or microprocessor. Accordingly, while the illustrated processing circuit 620 is one example of a processing circuit, the term "processing circuit" should be understood to refer to any suitable combination of digital hardware, microcontrollers, microprocessors, and/or memory.

Figure 7:
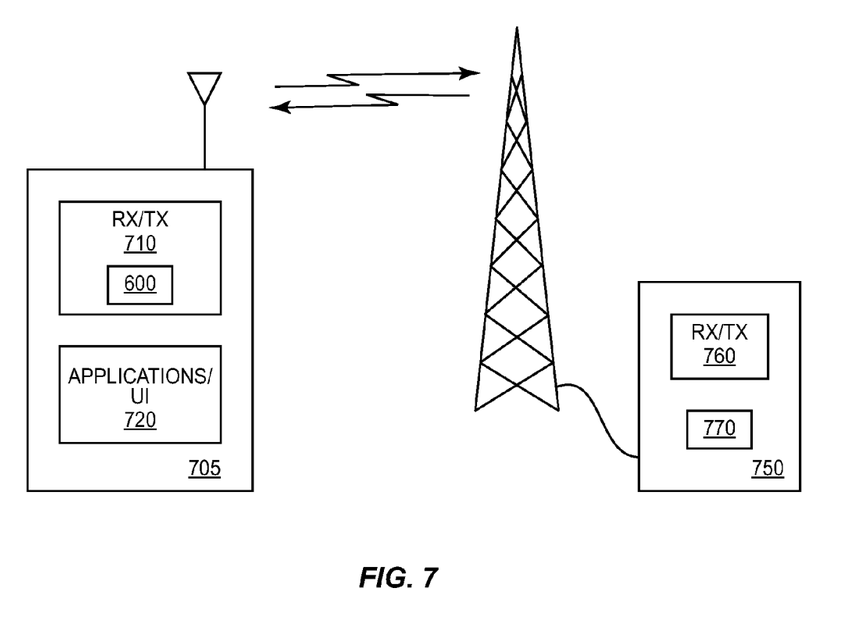
FIG. 7 illustrates a wireless communications system with wireless devices including receiver circuits like those of FIG. 6.

The techniques and circuits described above and illustrated in FIGS. 1-6 may be used in any number of wireless devices. An example application of these techniques and circuits is shown in FIG. 7, which illustrates a wireless device 705 communicating wirelessly with a base station 750, the latter of which includes a transceiver (RX/TX) circuit 760 and a control circuit 770. Wireless device 705, which may be a cellular telephone, wireless PDA, wireless-equipped laptop computer, etc., includes a transceiver (RX/TX) circuit 710 which includes the radio circuits and signal processing circuits necessary to carry out two-way wireless communications with base station 750, typically according to the requirements of one or more wireless telecommunications standards such as the 3GPP standards for W-CDMA or LTE. Transceiver circuit 710 in turn includes a receiver circuit 600, as discussed above in the description of FIG. 6. Wireless device 705 further includes an applications/UI circuit 720 for managing user applications and user interface (UI) functionality.

While FIG. 7 illustrates the use of the inventive techniques described herein in the context of a mobile device, rather than in a fixed base station, it should be appreciated that these techniques may also be used in wireless devices installed in fixed locations, such as in the base station 750 of FIG. 7. While a base station receiver is typically not subject to the same signal processing constraints of a mobile device, a base station performing channel transfer response estimation for signals received from mobile devices is still subject to the tracking bias problems discussed earlier, and may thus benefit from the improved techniques for obtaining smoothed channel responses described herein. Likewise, wireless devices in peer-to-peer or ad-hoc wireless networks may also benefit from these techniques.

The foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

What is claimed is:

1. A method, in a communications receiver, for obtaining smoothed channel response estimates, the method comprising:
    performing a plurality of channel response measurements corresponding to a path delay or to a signal frequency, or both, to obtain ordered channel measurement samples for a current estimation interval;
    for each of a first subset of a set of pre-determined filter responses, filtering the ordered channel measurement samples to obtain a corresponding set of estimated channel response samples;
    for each set of estimated channel response samples, calculating a corresponding set of ordered residuals from the channel measurement samples;
    evaluating each set of ordered residuals to determine a measure of correlation among the ordered residuals; and
    selecting an updated filter response from a second subset of the set of pre-determined filter responses, based on said evaluating, for use in demodulating a received signal.

2. The method of claim 1, wherein said first subset of pre-determined filter responses contains two or more pre-determined filter responses, each having a filter bandwidth, and wherein said second subset is equal to the first subset, the method further comprising using the set of estimated channel response samples corresponding to the selected one of the pre-determined filters for demodulating the received signal in the current estimation interval.

3. The method of claim 1, wherein the first subset of pre-determined filter responses contains a single pre-determined filter response and said second subset includes the first subset and one or more additional pre-determined filter responses, the method further comprising using the updated filter response to demodulate the received signal in an estimation interval following the current estimation interval.

4. The method of claim 1, wherein evaluating each set of ordered residuals comprises calculating a correlation function of the ordered residuals, wherein the measure of correlation is equal to a ratio of the correlation value at a lag of zero to the total correlation weight.

5. The method of claim 1, wherein evaluating each set of ordered residuals comprises counting a number of zero crossings between consecutive ones of the ordered residuals, wherein the measure of correlation is inversely related to the number of zero crossings.

6. The method of claim 1, wherein the ordered channel measurement samples are time-ordered channel measurement samples taken over an interval of time.

7. The method of claim 1, wherein the ordered channel measurement samples are frequency-ordered channel measurement samples taken across a set of sub-carrier frequencies.

8. The method of claim 1, further comprising repeating each of the performing, filtering, calculating, evaluating, and selecting operations for each of a series of channel estimation intervals.

9. The method of claim 2, wherein said selecting comprises selecting the set of estimated channel response samples corresponding to the lowest filter bandwidth among those of the two or more pre-determined filter responses that produce a corresponding measure of correlation less than a pre-determined threshold value.

10. The method of claim 3, wherein said evaluating comprises determining that the measure of correlation for the single pre-determined filter response is less than a first threshold and wherein said selecting the updated filter response comprises selecting a channel filter response that has a lower bandwidth than the first channel filter response, in response to said determining.

11. The method of claim 3, wherein said evaluating comprises determining that the measure of correlation for the single pre-determined filter response is greater than a second threshold and wherein selecting the first channel filter response comprises selecting a channel filter response that has a higher bandwidth than the first channel filter response, in response to said determining.

12. The method of claim 3, wherein said evaluating comprises determining that the measure of correlation for the single pre-determined filter response is between a first threshold and a second threshold, and wherein said selecting the first channel filter response comprises selecting the same channel filter response used in the current estimation interval for use in the estimation interval following the current estimation interval, in response to said determining.

13. The method of claim 5, further comprising determining a probability that sufficiently uncorrelated residuals would give rise to the counted number of zero crossings, wherein the measure of correlation is the determined probability.

14. A receiver circuit comprising
a channel response measurement circuit configured to perform a plurality of channel response measurements corresponding to a path delay or to a signal frequency, or both, to obtain ordered channel measurement samples for a current estimation interval, and
a processing circuit configured to:
for each of a first subset of a set of pre-determined filter responses, filter the ordered channel measurement samples to obtain a corresponding set of estimated channel response samples;
for each set of estimated channel response samples, calculate a corresponding set of ordered residuals from the channel measurement samples;
evaluate each set of ordered residuals to determine a measure of correlation among the ordered residuals; and
select an updated filter response from a second subset of the set of pre-determined filter responses, based on said evaluating, for use in demodulating a received signal.

15. The receiver circuit of claim 14, wherein said first subset of pre-determined filter responses comprises two or more pre-determined filter responses, each having a filter bandwidth, and wherein said second subset is equal to the first subset, and wherein the processing circuit is further configured to use the set of estimated channel response samples corresponding to the selected one of the pre-determined filters for demodulating the received signal in the current estimation interval.

16. The receiver circuit of claim 14, wherein the first subset of pre-determined filter responses comprises only a single pre-determined filter response and said second subset includes the first subset and one or more additional pre-determined filter responses, and wherein the processing circuit is further configured to use the updated filter response to demodulate the received signal in an estimation interval following the current estimation interval.

17. The receiver circuit of claim 14, wherein the processing circuit is configured to evaluate each set of ordered residuals by calculating a correlation function of the ordered residuals, wherein the measure of correlation is equal to a ratio of the correlation value at a lag of zero to the total correlation weight.

18. The receiver circuit claim 14, wherein the processing circuit is configured to evaluate each set of ordered residuals by counting a number of zero crossings between consecutive ones of the ordered residuals, wherein the measure of correlation is inversely related to the number of zero crossings.

19. The receiver circuit of claim 14, wherein the ordered channel measurement samples are time-ordered channel measurement samples taken over an interval of time.

20. The receiver circuit of claim 14, wherein the ordered channel measurement samples are frequency-ordered channel measurement samples taken across a set of sub-signal frequencies.

21. The receiver circuit of claim 14, wherein the processing circuit is further configured to repeat each of the performing, filtering, calculating, evaluating, and selecting operations for each of a series of channel estimation intervals.

22. A wireless device comprising the receiver circuit according to claim 14.

23. The receiver circuit of claim 15, wherein the processing circuit is configured to select the updated filter response by selecting the set of estimated channel response samples corresponding to the lowest filter bandwidth among those of the two or more pre-determined filter responses that produce a corresponding measure of correlation less than a pre-determined threshold value.

24. The receiver circuit of claim 16, wherein the processing circuit is configured to evaluate each set of ordered residuals by determining that the measure of correlation is less than a first threshold and wherein the processing circuit is configured to select the updated filter response by selecting a channel filter response that has a lower bandwidth than the first channel filter response, in response to said determining.

25. The receiver circuit of claim 16, wherein the processing circuit is configured to evaluate by determining that the measure of correlation is greater than a second threshold and to select the first channel filter response comprises by selecting a channel filter response that has a higher bandwidth than the first channel filter response, in response to said determining.

26. The receiver circuit of claim 16, wherein the processing circuit is configured to evaluate by determining that the measure of correlation is between a first threshold and a second threshold, and to select the first channel filter response by selecting the same channel filter response used in the current estimation period for use in the estimation interval following the current estimation interval, in response to said determining.

27. The receiver circuit of claim 18, wherein the processing circuit is further configured to determine a probability that sufficiently uncorrelated residuals would give rise to the counted number of zero crossings, wherein the measure of correlation is the determined probability.

* * * * *

UNITED STATES PATENT AND TRADEMARK OFFICE
CERTIFICATE OF CORRECTION

PATENT NO. : 8,737,457 B2  Page 1 of 1
APPLICATION NO. : 13/630194
DATED : May 27, 2014
INVENTOR(S) : Reial et al.

It is certified that error appears in the above-identified patent and that said Letters Patent is hereby corrected as shown below:

In the Specification

In Column 11, Line 30, delete "$P_{reject}$" and insert -- $P_{reject}$, --, therefor.

In the Claims

In Column 18, Line 11, in Claim 18, delete "circuit claim" and insert -- circuit of claim --, therefor.

Signed and Sealed this
Twenty-third Day of September, 2014

Michelle K. Lee
*Deputy Director of the United States Patent and Trademark Office*